United States Patent
Mikami

(10) Patent No.: US 6,926,417 B2
(45) Date of Patent: Aug. 9, 2005

(54) ILLUMINATION STRUCTURE OF DIAL PLATE

(75) Inventor: Katsuyoshi Mikami, Shimada (JP)

(73) Assignee: Yazaki Corporation, Tokyo (JP)

(*) Notice: Subject to any disclaimer, the term of this patent is extended or adjusted under 35 U.S.C. 154(b) by 0 days.

(21) Appl. No.: 10/709,049

(22) Filed: Apr. 8, 2004

(65) Prior Publication Data

US 2004/0212976 A1 Oct. 28, 2004

(30) Foreign Application Priority Data

Apr. 22, 2003 (JP) .................................. 2003-116777

(51) Int. Cl.[7] .............................................. G01D 11/28
(52) U.S. Cl. .................................. 362/23; 116/DIG. 36
(58) Field of Search ............................ 362/23, 26, 29, 362/30; 116/257, 286, 288, 310, DIG. 36

(56) References Cited

U.S. PATENT DOCUMENTS

| 2,916,011 | A | * | 12/1959 | Molis | 116/288 |
| 6,161,934 | A | * | 12/2000 | Griffin et al. | 362/26 |
| 6,595,667 | B1 | * | 7/2003 | Obata | 362/26 |

FOREIGN PATENT DOCUMENTS

| JP | 60-27394 | 2/1985 |
| JP | 3-2220 | 1/1991 |
| JP | 2001-201372 | 7/2001 |

* cited by examiner

*Primary Examiner*—Y. My Quach-Lee
(74) *Attorney, Agent, or Firm*—Armstrong, Kratz, Quintos, Hanson & Brooks, LLP

(57) ABSTRACT

A cylinder is formed around a pointer shaft below a dial plate. A shade is projecting from an outer wall of a cylinder. The shade prevents inner figures on the dial plate from being illuminated by direct light from a light source at a back side of the dial plate. According to this structure, the inner figures and outer figures on the dial plate are illuminated uniformly.

5 Claims, 3 Drawing Sheets

ILLUMINATION STRUCTURE OF DIAL PLATE

FIELD OF THE INVENTION

This invention relates to an illumination structure of a dial plate, in particular used in a vehicle instrument panel, to be illuminated uniformly at low cost.

DESCRIPTION OF THE RELATED ART

Recently, for reduction in size and weight of an instrument panel for a vehicle, there are some illumination structures of a dial plate used in an instrument panel, in which a dial plate or a pointer is illuminated directly from a light source or a reflection light from a reflector arranged at a back side of the dial plate without any light guiding member. Among these illumination structures, in a structure described in the Patent Document 1 as listed below, the dial plate and the pointer are illuminated simultaneously by a light source arranged at a back side of the dial plate and below a pointer base.

As prior arts of this invention, a list of references are:
[Patent Document 1]
   Japanese Patent Application Laid-Open No. 2001-201372 (FIG. 1);
[Patent Document 2]
   Japanese Utility Model Application Laid-Open No. S60-27394; and
[Patent Document 3]
   Japanese Utility Model Application Laid-Open No. H03-2220.

FIG. 7 is a section view showing a conventional illumination structure as described above. Suppose that the illumination structure shown in FIG. 7 is used in a tachometer of a vehicle. As shown in FIG. 7, outline of figures 911 as a unit of revolutions per minutes, and outlines of figures 912 as numerals and graduations of the tachometer at outer side than the figure 911 from a center of the dial plate are printed on a tachometer display of a dial plate 901. Further, a round hole 913 for inserting a pointer shaft is formed at a position where the pointer base of the pointer 902 on the dial plate 901 is arranged.

A pointer 902 basically includes a hand 921, a pointer shaft 922, and a pointer cap 923 for covering the pointer base. The pointer 902 receives light from the light source L901 at the pointer base. This light travels toward a tip of the pointer 902 while being reflected repeatedly inside the hand 921. Thus, the pointer 902 emits light having a color based on a color of a hot stamped surface of the hand 921.

A reflector 933 is formed on a case, on which the dial plate 901 is overlapped. The reflector 933 covers a rotation range of the pointer 902, and reflects the light from the light source L901 to a back surface of the dial plate 901. Further, a cylinder 934 is formed around the pointer shaft 922 on the case to supply the light from the light source L901 to the pointer base effectively.

Various electronics parts such as the light source L901, a movement 905 are assembled on a substrate 904, which is arranged below the case. The light source L901 is so arranged on the substrate 904 as to supply the light to the back surface of the dial plate 901 and the pointer base simultaneously. A body of the movement 905 is arranged at the back surface of the substrate 904. A rotary shaft 951 of the movement 905 penetrates the pointer shaft 922 through the substrate 904.

In this structure, when the light source L901 lights corresponding to a specific signal, the light from the light source L901 travels upward inside the cylinder 934 to enter the pointer base (not shown). As described above, this light travels toward the tip inside the hand 921 while being reflected repeatedly to illuminate the pointer 902. In addition, the light from the light source L901 is supplied simultaneously to the pointer base and the back surface of the dial plate. Namely, as indicated by R91, some of the light directly reaches the back surface of the dial plate, and as indicated by R92, some of the light reaches the back surface of the dial plate after being reflected once or more by the reflector 933.

The figures 912 at the outer side are illuminated properly, because the figures 912 are illuminated by the reflected light R92 and the direct light from the source L901, which is arranged at a proper distance from the figures 912.

On the other hand, the FIG. 911 is illuminated excessively, because the FIG. 911 is nearer the light source L901 than the figures 912, and receives more light, including the direct light R91, than the figures 912. Thus, not all of the figures on the 901 are illuminated uniformly. Thus, appearance and visibility of the dial plate are degraded.

For preventing above non-uniformity of the illuminated figures, both the patent documents 1 and 2 disclose additional member or special printing, those of which raise a production cost of the dial plate.

This invention has been accomplished to solve the above-described problems and an object of this invention is to provide an illumination structure in which figures on a dial plate can be illuminated uniformly at low cost.

SUMMARY OF THE INVENTION

In order to attain the object, according to this invention, there is provided an illumination structure of a dial plate comprising:

a dial plate having inner figures arranged near a hole, and outer figures arranged at a distant part from the hole, said hole into which a pointer shaft is inserted;

a light source arranged at a back side of the dial plate below a pointer base, and supplying light simultaneously to a back surface of the dial plate and the pointer base;

a cylinder formed around the pointer shaft, and having an inner cavity having substantially the same diameter as said hole; and a shade projecting from an outer wall of the cylinder for preventing the inner figures from being illuminated by the direct light emitted from the light source.

According to above, the light traveling directly to the inner figures from the light source is shaded by the shade projecting from the outer wall of the cylinder. Therefore, the inner figures are prevented from being illuminated excessively. Further, the shade is integrally molded with the cylinder, so that a production cost does not become high.

Preferably, according to this invention, there is provided the illumination structure, wherein said shade has a plate-like shape extending laterally from the outer wall of the cylinder.

According to above, since the shade has a plate-like shape extending laterally from the outer wall of the cylinder, the shade is easy to be molded.

Preferably, according to this invention, there is provided the illumination structure, wherein said shade has a plate-like shape extending laterally from the outer wall of the cylinder, and being bent downward at the extreme end thereof.

According to above, a length of the projection of the shade in a direction parallel to the dial plate is regulated.

Preferably, according to this invention, there is provided the illumination structure, wherein said shade has a plate-like shape projecting laterally from an outer wall of a inverted semicircular cone, said cone extending from the outer wall of the cylinder at a truncated tip thereof.

According to above, light from the light source can be used more effectively.

Preferably, according to this invention, there is provided the illumination structure, wherein said shade has a dome-like shape extending from the outer wall of the cylinder.

According to above, since the shade has a dome-like shape extending from the outer wall of the cylinder, the light traveling toward the inner figures is diffused to illuminate the inner figures more uniformly, so that illumination quality of the inner figures can be improved.

DESCRIPTION OF THE PREFERRED EMBODIMENT

Figure 1:
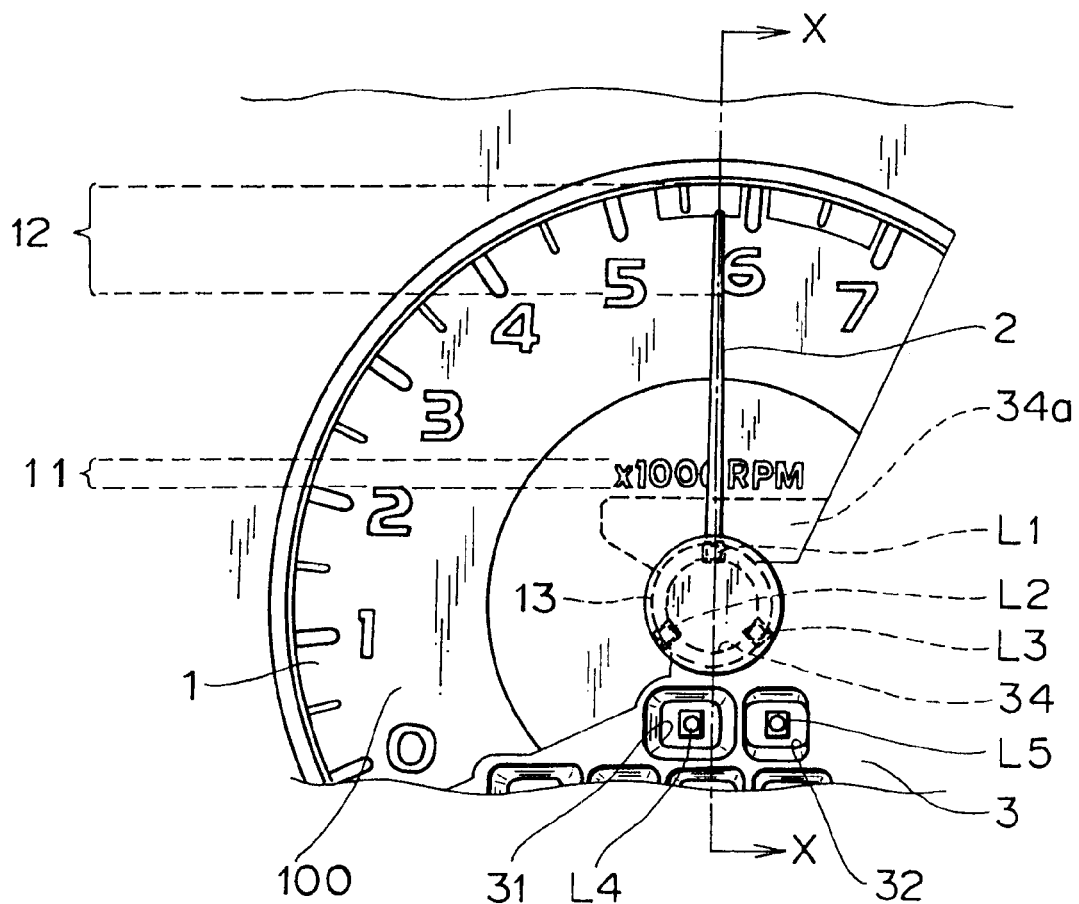
FIG. 1 is a front view showing a first embodiment of an illumination structure according to this invention.
Figure 3:
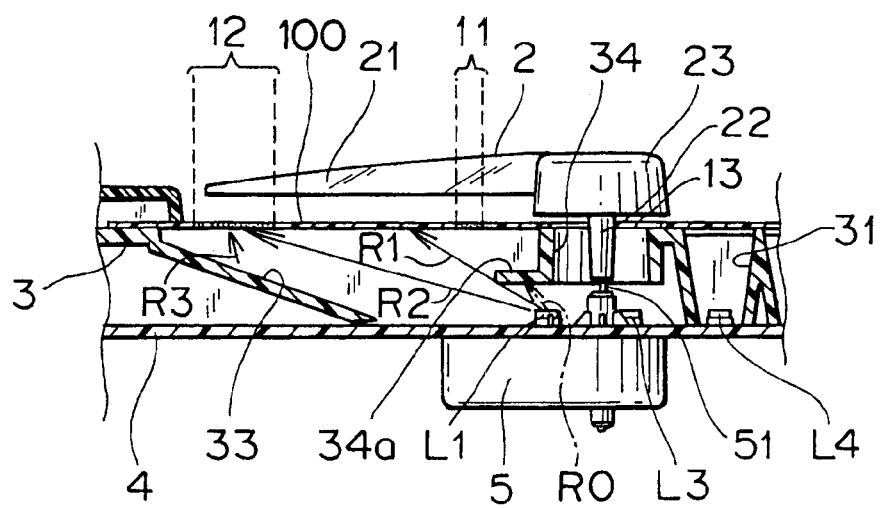
FIG. 3 is a section view taken on line X—X of FIG. 1.
Figure 2:
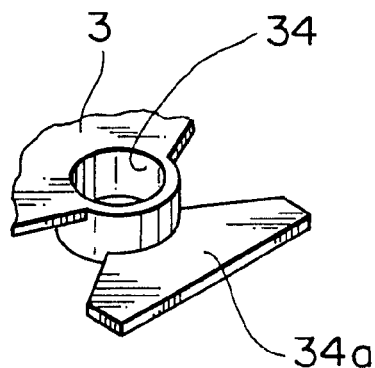
FIG. 2 is a partial section view showing a vicinity of a shade shown in FIG. 1.

One embodiment of an illumination structure according to this invention will now be described with reference to the attached drawings. First, FIGS. 1 to 3 show a first embodiment of this invention. FIG. 1 shows a partial front view of a dial plate.

Recently, a so-called combination meter, in which a speedometer, a tachometer, a voltage meter, an oil pressure gauge and the like are arranged, is commonly mounted on a vehicle. This embodiment is applied to the tachometer of the combination meter.

As shown in FIGS. 1 to 3, a display 100 of the dial plate 1 has a unit label 11 (corresponding to the inner figures in claims), displaying such as "x1000RPM", and figures 12 (corresponding to the outer figures in claims), including numerals and graduations, and displaying such as "1", "2". A base of the dial plate 1 is made of a transparent polycarbonate sheet, and colored such as blue, orange, white, or the like. The dial plate 1 is coated with ink, such as black ink, except for the inner figures 11 and the outer figures 12. The dial plate 1 also has other figures such as various warnings. However, they are omitted here. A round hole 13 for inserting a pointer shaft is formed on the dial plate 1 at a position where a pointer base of the pointer 2 is arranged.

The pointer 2 basically includes, as generally known, a transparent hand 21 made of synthetic resin, a pointer shaft 22 extending downward below the pointer base, and a pointer cap 23 covering over the pointer base. The pointer 2 receives lights of the light sources L1, L2 and L3 at the pointer base. These lights travel toward a tip of the pointer 2 while being reflected repeatedly inside the hand 21. Thus, the pointer 2 emits light having a color based on colors of light sources L1, L2, L3 and a hot stamped surface of the hand 21.

The dial plate 1 is overlapped on a case 3 made of synthetic resin. The case 3 has light source receiving chambers 31, 32 to receive light sources L4, L5, a reflector 33, and a cylinder 34. The light sources L4, L5 illuminate various warning figures on the dial plate 1 from the back surface of the dial plate 1. The reflector 33 covers a rotation range of the pointer 2, and reflects the lights from the L1, L2, and L3 to the back surface of the dial plate 1. The cylinder 34 is formed around the pointer shaft 22 on the case 3 to supply the lights from the light sources L1, L2 and L3 to the pointer base effectively.

A shade 34a, which characterizes this invention, is formed integrally with the cylinder 34. As shown in FIGS. 1 to 3, in particular, as shown in FIG. 3, the shade 34a has a plate-like shape extending laterally from the outer wall of the cylinder 34. The shade 34a projects to shade the inner figures 11 from the light R0 traveling directly from the light source L1. Further, a width of the shade 34a is rather longer than the label "x1000RPM" of the inner figures 11 to shade the light R0 more efficiently.

A substrate 4 is arranged below the case 3. Various electronic parts of the dial plate such as light sources L1 to L5, and a movement 5 are assembled on the substrate 4. For example, light emitting diodes (LED), as commonly known, are used as the light sources L1 to L5. In particular, the light sources L1 to L3 are so arranged on the substrate 4 as to supply lights to the back surface of the dial plate 1 and the pointer base simultaneously. A body of the movement 5 is arranged at a back side of the substrate 4. A rotary shaft 51 of the movement 5 penetrates the pointer shaft 22 through the substrate 4. In addition, a rear cover below the substrate 4, a front pane covering the dial plate 1, and the like are omitted here.

Effects produced by this illumination structure will be explained below with reference to FIG. 3.

When the light sources L1, L2 and L3 emit lights corresponding to a specific signal, the lights travel upward inside the cylinder 34 to enter the pointer base (not shown). These lights travel toward the tip of the pointer 2 while being reflected repeatedly, so that the pointer 2 emits with a specific color.

Further, the lights from the light sources L1, L2 and L3 are supplied simultaneously to the pointer base and the back surface of the dial plate 1 simultaneously. Namely, as shown by R1, R2 and R3 in FIG. 3, a part of the lights directly, and the other lights after reflected by the reflector 33 once or more, enter the back surface of the dial plate 1. These lights illuminate the outer figures 12. On the other hand, as described above, the light R0 from the light source L1 is shaded by the shade 34a, so that the R0 cannot directly enter the inner figures 11. Thus, the inner figures 11 and the outer figures 12 are illuminated uniformly.

A supplementary explanation is given below. The outer figures 12 are illuminated properly by the direct light R2, the reflected light R3 and the like. On the other hand, since the inner figures 11 are near the light source L1, without the shade 34a, the inner figures 11 is illuminated excessively by the direct light R0. However, the shade 34a shades the direct light R0. Further, since receiving reflected lights of R1, R2, R3 and the like, the inner figures 11 are illuminated properly. Under these effects, the inner figures 11 and the outer figures 12 are illuminated uniformly.

Since the inner figures 11 and the outer figures 12 are illuminated uniformly, the visibility and the appearance of the dial plate 1 are improved. Further, since the shade 34a is molded integrally with the cylinder 34, such effects are achieved at low cost.

Another embodiment of the shade 34a, namely a second embodiment of this invention, will be explained below with reference to FIGS. 4A and 4B.

Figure 4A:
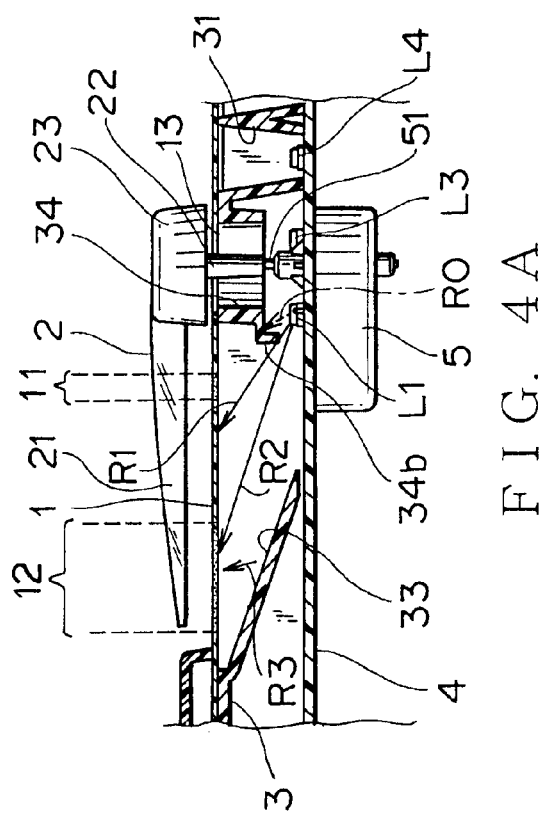
FIG. 4A is a section view showing a second embodiment of the illumination structure according to this invention.

As shown in FIG. 4A, in an illumination structure according to the second embodiment, a shade 34b has a plate-like shape, extending laterally from the outer wall of the cylinder 34, instead of the plane shape of the shade 34a. The shade 34b shades the direct light R0 as well as the shade 34a of the first embodiment. A structure of the shade 34b regulates a length of a projection of the shade 34b in a direction parallel to the dial 1.

Figure 4B:
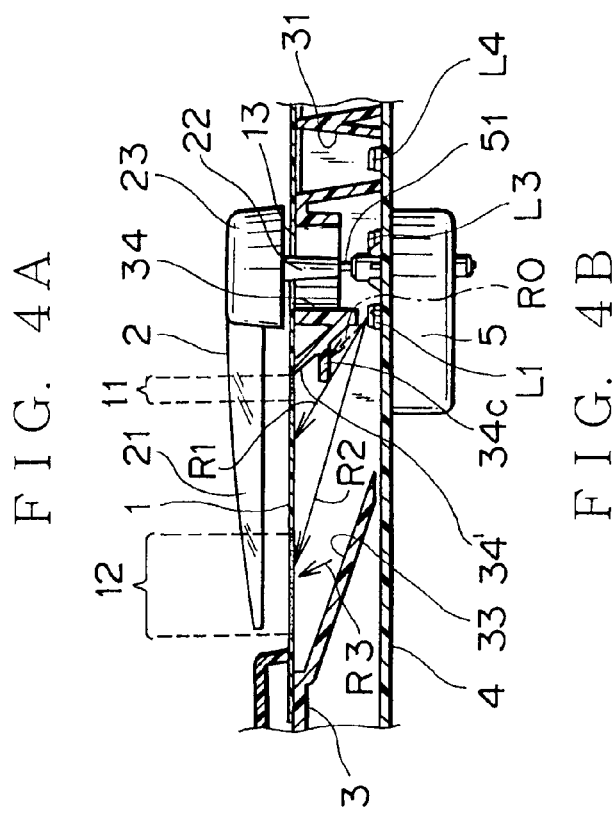
FIG. 4B is a section view showing a third embodiment of the illumination structure according to this invention.

In the third embodiment of the illumination structure, as shown in FIG. 4B, instead of the plane shade 34a, a shade 34c has a plate-like shape projecting laterally from an outer wall of an inverted semicircular cone, said cone extending from the outer wall of the cylinder 34 at a truncated tip thereof. The shade 34c reflects lights from the light sources L1, L2 and L3 once or more to use these lights more efficiently for illuminating the dial 1. Further, the shade 34c shades the direct light R0 as well as the shade 34a of the first embodiment.

A fourth embodiment of an illumination structure according to this invention will be explained below with reference to FIGS. 5 and 6. In this embodiment, the structure is applied to a voltage meter of a vehicle battery, and an oil pressure gauge of an engine, both of which are arranged at the left side of the tachometer.

Figure 6:
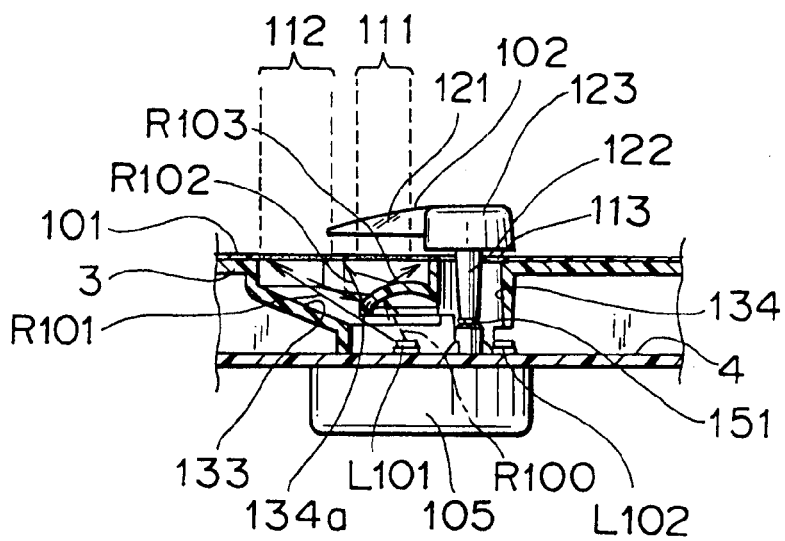
FIG. 6 is a section view taken on line Y—Y of FIG. 5.
Figure 7:
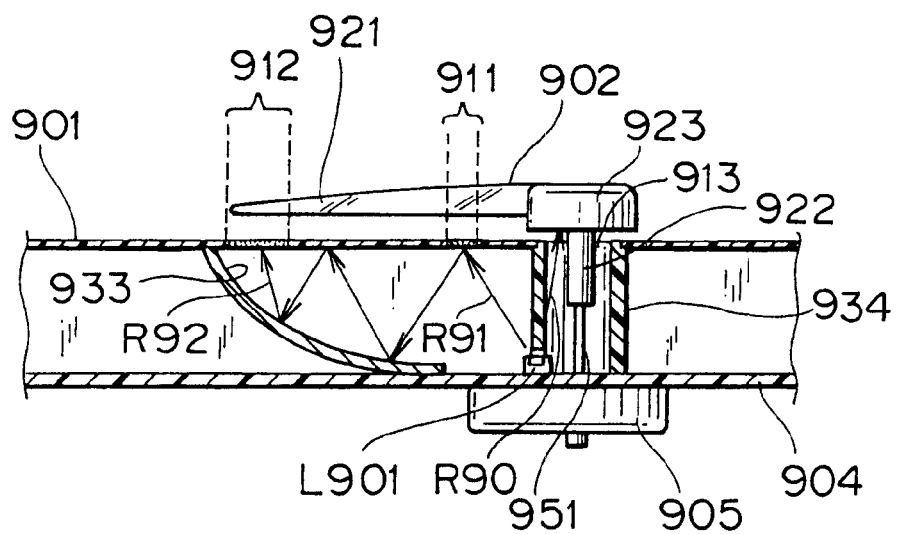
FIG. 7 is a section view showing a conventional illumination structure.
Figure 5:
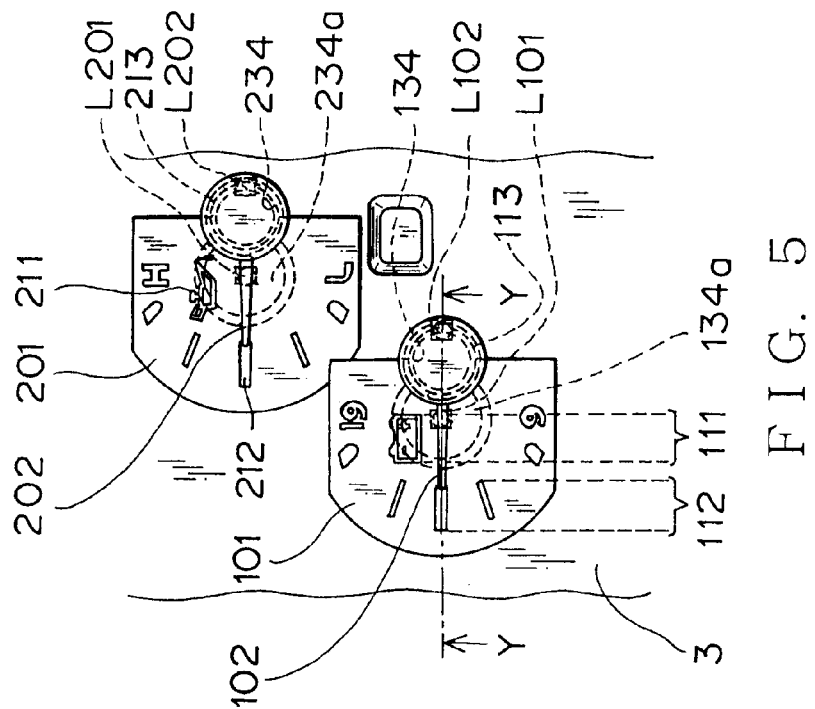
FIG. 5 is a front view showing a fourth embodiment of the illumination structure according to this invention.

As shown in FIGS. 5 and 6, figures 111 (corresponding to the inner figures of the claims) such as a battery icon, and figures 112 (corresponding to the outer figures of the claims) such as numerals, graduations and numerals and the like, are formed in a display 101 of the dial 1. A base of the display 101 is made of a transparent polycarbonate sheet, colored such as blue, orange, white, or the like, as well as the dial plate 1. The base is coated with ink, such as black ink, except for the inner figures 111 and the outer figures 112. A round hole 113 for inserting a pointer shaft is formed at a position where a pointer base of the pointer 102 is arranged on the dial plate 1.

The pointer 102 basically includes, as well as the pointer 2, a transparent hand 121, a pointer shaft 122, and a pointer cap 123. The pointer 102 receives lights from the light sources L101 and L102 at the pointer base. These lights travel toward a tip of the pointer 102 while being reflected repeatedly inside the hand 121. Thus, the pointer 102 emits light having a color based on colors of light sources L101, L102, and a hot stamped surface of the hand 121.

The case 3, on which the display 101 is overlapped, has a reflector 133 and a cylinder 134. The reflector 133 covers a rotation range of the pointer 102, and reflects the lights from the L101 and L102 to the back surface of the dial plate 1. The cylinder 134 is formed around the pointer shaft 122 on the case 3 to supply the lights from the light sources L101 and L102 to the pointer base effectively.

A shade 134a is formed integrally with the cylinder 134 near the substrate. The shade 134a has a dome-like shape extending from the outer wall of the cylinder 134. The shade 134a projects to shade the inner figures 111 from the light R100 traveling directly from the light source L101. Further, the shade 134a is so formed in a dome-like shape being convex upward that the light reflected by the reflector 133 further reflects diffusely and uniformly.

Various electronic parts for the display 101 such as light sources L101, L102, and a movement 5 are assembled on the substrate 4 arranged below the case 3. For example, light emitting diodes (LED), as commonly known, are used as the light sources L101 and L102. The light sources L101 and L102 are so arranged on the substrate 4 as to supply lights to the back surface of the dial plate 1 and the pointer base simultaneously. A body of the movement 105 is arranged at a back side of the substrate 4. A rotary shaft 151 of the movement 105 penetrates the pointer shaft 122 through the substrate 4.

In addition, a display 201 for the oil pressure gauge has the same structure as the display 101 for the voltage meter. Namely, figures 211 (corresponding to the inner figures of the claims) such as an oil pressure icon, and figures 212 (corresponding to the outer figures of the claims) such as numerals, graduations and numerals and the like, are formed in the display 201. A round hole 213 for inserting a pointer shaft is formed at a position where a pointer base of the pointer 202 is arranged. Light sources L201, L202, a cylinder 234, and a shade 234a are respectively the same structures as the light sources L101, L102, the cylinder 134, and the shade 134a. Therefore, a detailed explanation of the display 101 will be provided, while a detailed explanation of the display 102 will be omitted below.

Effects of such illumination structure will be explained below with reference to FIG. 6.

When the light sources L101, L102 emit lights corresponding to a specific signal, the lights travel upward inside the cylinder 134 to enter the pointer base (not shown). These lights travel toward the tip of the pointer 102 while being reflected repeatedly, so that the pointer 102 emits with a specific color.

Further, the lights from the light sources L101, L102 are supplied simultaneously to the pointer base and the back surface of the dial plate 1 simultaneously. Namely, as shown by R101 in FIG. 6, a part of the lights directly, and the other lights after reflected by the reflector 133 once or more, enter the back surface of the dial plate 1. These lights illuminate the outer figures 112. Namely, the outer figures 112 are illuminated properly by the light sources L101 and the L102, being arranged at proper distances from the outer figures 112.

On the other hand, as described above, the light R100 from the light source L101 is shaded by the shade 134a, so that the R100 cannot directly enter the inner figures 111. Thus, the inner figures 111 and the outer figures 112 are illuminated uniformly. Further, the reflected light reflected by the reflector 133 and uniformly diffused light by a convex surface of the shade 134a are supplied to the inner figures 111, illumination quality of the inner figures 111 is improved. In addition, the structure of the display 201 has the same effects as the structure of the display 101.

As described above, according to this invention, there is provided an illumination structure of a dial plate to be illuminated uniformly at low cost.

In addition, this invention is not limited to above described embodiments, and various changes and modifications can be made without departing from the spirit and scope of this invention. For example, this illumination structure can be applied not only to a combination meter, but also to other meters used in a vehicle. Further, this structure can be applied not limited to meters used in a vehicle. The shades 34a, 34b and 34c can be applied not only to a tachometer display as described in above embodiments. The shades 134a and 234a can be applied not limited to the voltage meter or the oil pressure gauge. Further, this structure can be applied to any part of a combination meter singly, for example, a speedometer, or a tachometer.

What is claimed is:

1. An illumination structure of a dial plate comprising:

a dial plate having inner figures arranged near a hole, and outer figures arranged at a distant part from the hole, said hole into which a pointer shaft is inserted;

a light source arranged at a back side of the dial plate below a pointer base, and supplying light simultaneously to a back surface of the dial plate and the pointer base;

a cylinder formed around the pointer shaft, and having an inner cavity having substantially the same diameter as said hole; and a shade spaced from the dial plate and projecting from an outer wall of the cylinder a distance from the outer wall so as to prevent the inner figures from being illuminated by the direct light emitted from the light source.

2. An illumination structure of a dial plate comprising:

a dial plate having inner figures arranged near a hole, and outer figures arranged at a distant part from the hole, said hole into which a pointer shaft is inserted;

a light source arranged at a back side of the dial plate below a pointer base, and supplying light simultaneously to a back surface of the dial plate and the pointer base;

a cylinder formed around the pointer shaft, and having an inner cavity having substantially the same diameter as said hole; and a shade spaced from the dial plate and projecting from an outer wall of the cylinder a distance from the outer wall so as to prevent the inner figures from being illuminated by the direct light emitted from the light source, wherein said shade has a plate-like shape extending laterally from the outer wall of the cylinder.

3. An illumination structure of a dial plate comprising:

a dial plate having inner figures arranged near a hole, and outer figures arranged at a distant part from the hole, said hole into which a pointer shaft is inserted;

a light source arranged at a back side of the dial plate below a pointer base, and supplying light simultaneously to a back surface of the dial plate and the pointer base;

a cylinder formed around the pointer shaft, and having an inner cavity having substantially the same diameter as said hole; and a shade spaced from the dial plate and projecting from an outer wall of the cylinder a distance from the outer wall so as to prevent the inner figures from being illuminated by the direct light emitted from the light source;

wherein said shade has a plate-like shape extending laterally from the outer wall of the cylinder, and being bent downward at an extreme end thereof.

4. An illumination structure of a dial plate comprising:

a dial plate having inner figures arranged near a hole, and outer figures arranged at a distant part from the hole, said hole into which a pointer shaft is inserted;

a light source arranged at a back side of the dial plate below a pointer base, and supplying light simultaneously to a back surface of the dial plate and the pointer base;

a cylinder formed around the pointer shaft, and having an inner cavity having substantially the same diameter as said hole; and a shade spaced from the dial plate and projecting from an outer wall of the cylinder a distance from the outer wall so as to prevent the inner figures from being illuminated by the direct light emitted from the light source, wherein said shade has a dome-like shape extending from the outer wall of the cylinder.

5. An illumination structure of a dial plate comprising:

a dial plate having inner figures arranged near a hole, and outer figures arranged at a distant part from the hole, said hole into which a pointer shaft is inserted;

a light source arranged at a back side of the dial plate below a pointer base, and supplying light simultaneously to a back surface of the dial plate and the pointer base;

a cylinder formed around the pointer shaft, and having an inner cavity having substantially the same diameter as said hole; and a shade spaced from the dial plate and having a plate like shape projecting laterally from an outer wall of an inverted semicircular cone a distance from the outer wall of the cone so as to prevent the inner figures from being illuminated by the direct light emitted from the light source, and said cone extending from an outer wall of the cylinder at a truncated tip thereof.

* * * * *